Figure 1:
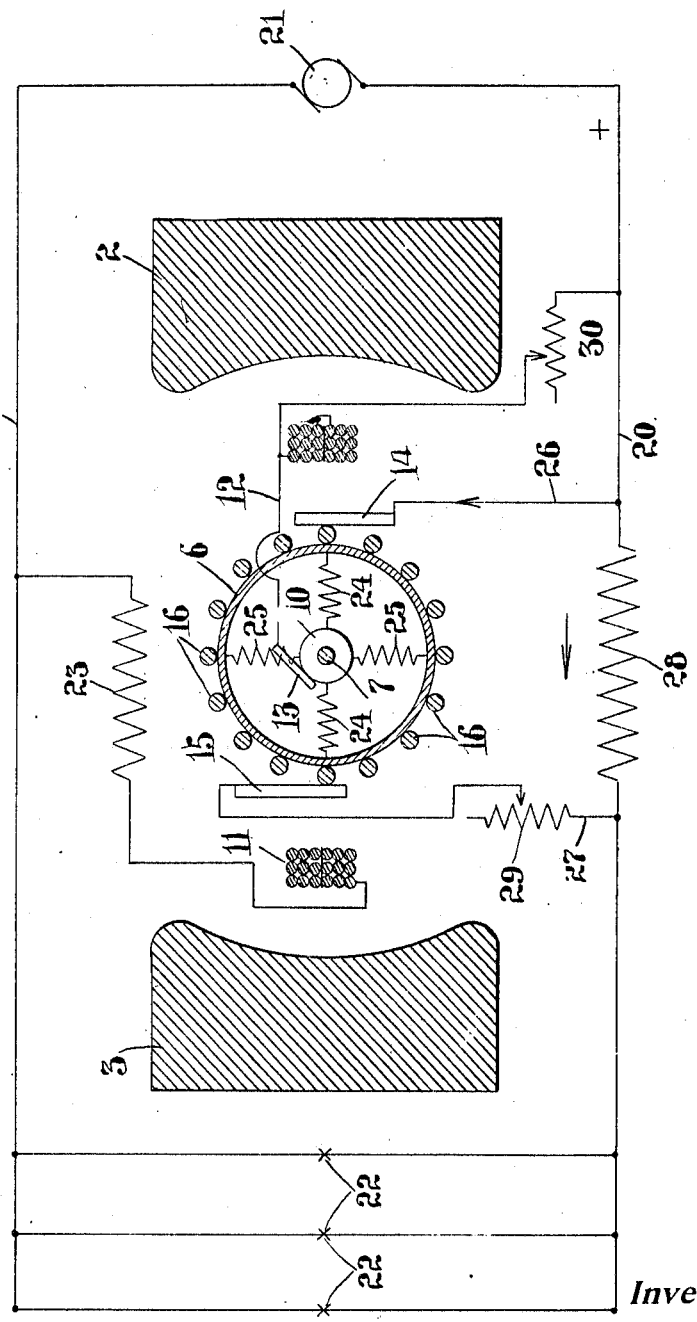

T. W. VARLEY.
ELECTRICAL MEASURING INSTRUMENT.
APPLICATION FILED JUNE 12, 1908.

978,518.

Patented Dec. 13, 1910.

2 SHEETS—SHEET 1.

Attest:

Inventor:
by Thomas W. Varley
Mastick & Jones his Attys

T. W. VARLEY.
ELECTRICAL MEASURING INSTRUMENT.
APPLICATION FILED JUNE 12, 1908.
978,518.
Patented Dec. 13, 1910.
2 SHEETS—SHEET 2.
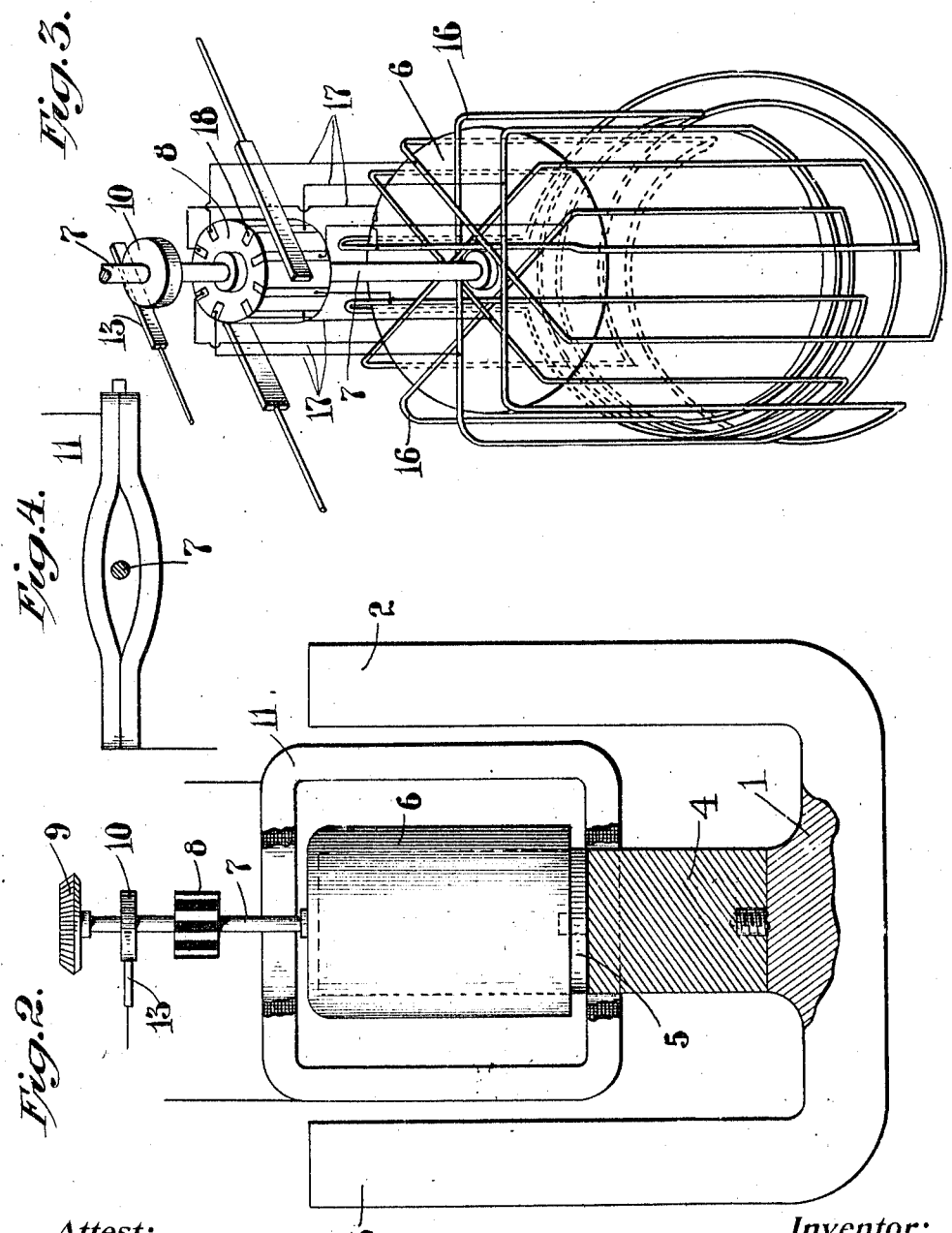
Attest:
Inventor:
Thomas W. Varley
by Mastick & Jones
his Attys

UNITED STATES PATENT OFFICE.

THOMAS W. VARLEY, OF NEW YORK, N. Y., ASSIGNOR TO WESTINGHOUSE ELECTRIC AND MANUFACTURING COMPANY, A CORPORATION OF PENNSYLVANIA.

ELECTRICAL MEASURING INSTRUMENT.

978,518.  Specification of Letters Patent.  Patented Dec. 13, 1910.

Application filed June 12, 1908. Serial No. 438,019.

*To all whom it may concern:*

Be it known that I, THOMAS W. VARLEY, a citizen of the United States of America, residing at New York city, in the county of New York and State of New York, have invented certain new and useful Improvements in Electrical Measuring Instruments, of which the following is a specification.

My invention relates to improvements in electrical measuring instruments of that class wherein a movable element is employed in connection with a shifting or changing field, adapted to impart movement to said movable element, and a substantially constant field adapted to retard the movement of said movable element by inductive action. I have heretofore in United States Letters Patent No. 810,235, issued to me January 16, 1906, described and claimed certain features of such electrical instruments generically.

This invention has reference to improvements on the generic idea showing other means of carrying out the broad principle, together with certain modifications of electrical connections and circuits.

In the following I have described, with reference to the accompanying drawings, one type of electrical measuring instrument, illustrating the application of the principles referred to, the features of the invention being more particularly pointed out hereinafter in the claims.

In the drawings Figure 1 is a plan view, partly diagrammatic, of one form of apparatus adapted to be used as a watt hour meter. Fig. 2 is a side elevation of the apparatus, partly in section and parts being removed, to show more clearly the relationship of the stationary or field winding to the other parts, and Fig. 3 is a perspective view of the movable element or armature, parts being removed, showing the windings as adapted for a regular two-pole armature. Fig. 4 is a top plan view of the stationary coil, parts being removed, showing the relationship of said coil to the shaft.

Similar numerals of reference indicate similar parts throughout the several views.

1 represents a substantially constant magnet, either electro or permanent, here illustrated as a permanent magnet, for causing a substantially constant field and having poles 2 and 3.

4 represents a support for core 5, preferably made of non-magnetic material. A cup 6, preferably of aluminum, surrounds core 5 and is supported from a shaft 7, carrying a commutator 8 and a gear 9 adapted to actuate any suitable registering means (not shown). Shaft 7 also carries a collecting ring 10.

11 represents a fixed or stationary winding for shifting the constant field, and supported in any suitable manner as by core support 4. Winding 11 is in electrical connection by means of wire 12 with ring 10 as by means of a suitable brush 13.

14 and 15 are brushes diametrically disposed with reference to commutator 8 and arranged at a point 90° from the regular commutating position if the apparatus were used as a motor. Cup 6 carries a winding 16, as shown in Fig. 3, constituting a 2 pole armature. Taps 17 from winding 16 are connected serially with commutator segments 18 of commutator 8, the connections not being fully shown to avoid complexity of illustration.

In Fig. 1 brushes 14 and 15 are diagrammatically illustrated as in contact with winding 16 on cup 6 so as to show more clearly their position relative to the constant field.

19 and 20, Fig. 1, represent the mains leading from a suitable source 21; 22 represents the load. A resistance 23 is between main 19 and the winding 11 of the fixed coil. Across the armature and connecting any two preferably diametrically opposite points are one or more pairs of resistances, 24—24 and 25—25, whose center points go to collector ring 10 as shown. Connections 26 and 27 are taken from opposite ends of a resistance 28 in the load circuit or main 20 to the brushes 14 and 15 respectively.

29 is an adjustable resistance in connection 27 and 30 is an adjustable resistance between main 20 and brush 13.

In Fig. 1 under normal conditions, that is, with no load on, the armature takes current equally and in the same direction from main 20 through brushes 14 and 15, the algebraic difference of the currents through the brushes being zero, the current passing from brushes 14 and 15 through the armature winding to resistances 24—24 and 25—25, to collector ring 7, to fixed coil 11, to resistance 23 and thence to the opposite main 19. Resistance 30 adjusts the amount of current flowing through the armature to the field or stationary coil 11. Under these conditions the current enters the armature in the same direction through both brushes 14 and 15 and the current in the winding of the armature is in such direction as to keep it in a balanced condition relative to the constant field. Under these conditions, although the fixed coil shifts the constant field in a diagonal direction, the armature still remains in a balanced condition because the current enters the armature equally through the brushes 14 and 15.

Adjustable resistance 29 serves a double function. With conditions as above described it causes the currents through brushes 14 and 15 to differ in amount, thus causing the armature to become unbalanced to compensate for initial friction. When the load is on current for the load passes through resistance 28. This causes a difference in potential between connections 26 and 27, thus affecting the current through brushes 14 and 15 which unbalances the armature, this unbalancing being proportional to the load. Resistance 29 being in circuit with the armature across resistance 28, its second function is to regulate the effect of the load current on the armature. The torque of rotation varies in proportion to the amount of the shifted field and to the algebraic differences in the currents flowing through the armature, or in proportion to the voltage in the circuit and the current to the load or to the watts of the load. The reason for taking potential current through the third brush 13 is to insure contact of brushes 14 and 15 with the commutator as, if either brush tends to open, its potential at the opening is raised so as to help keep it closed. As stated above the potential current is also used to compensate for initial friction.

The principles of the invention as shown and described are applicable to either alternating or direct currents and may be utilized in the construction of volt meters and ammeters as well as in either integrating or indicating watt meters, as is clear to any one skilled in the art.

It is obvious that the details illustrated may be considerably varied and parts and functions transposed without departing from the spirit of my invention, as, for instance, using a greater or less number of windings than illustrated or transposing the functions of the field shifting and armature windings or utilizing other forms of armature or rotating or movable members than as described.

Having described my invention what I claim and desire to secure by Letters Patent is:

1. In an apparatus of the character described a substantially constant magnet, a coil adapted to shift or distort the field caused by said magnet, an armature in said field adapted to respond to the shifting or distorting thereof and a resistance across the armature adapted to collect current from different points thereof, said coil, armature and resistance being connected in the same circuit.

2. In an apparatus of the character described a substantially constant magnet, a coil adapted to shift or distort the field caused by said magnet, an armature in said field adapted to respond to the shifting or distorting thereof, a resistance across the armature adapted to collect current from different points thereof, a resistance in the main circuit, diametrically disposed brushes connecting the armature to said resistance and means for taking off current from said resistance at a point intermediate the ends thereof.

3. In an apparatus of the character described a substantially constant magnet, a coil adapted to shift or distort the field caused by said magnet, an armature in said field adapted to respond to the shifting or distorting thereof, a resistance across the armature adapted to collect current from opposite points thereof, a collector ring in connection with said resistance at approximately the middle point thereof and a connection from said collector ring to said coil.

4. In an apparatus of the character described a substantially constant magnet, a coil adapted to shift or distort the field caused by said magnet, an armature in said field adapted to respond to the shifting or distorting thereof, a resistance across the armature adapted to collect current from different points thereof, means for taking off current from said resistance at a point intermediate the ends thereof and an adjustable resistance between said means and one of the main lines.

5. In an apparatus of the character described, a substantially constant magnet, a coil adapted to shift or distort the field caused by said magnet, an armature in said field adapted to respond to the shifting or distorting thereof, and having more than one connection to one side of the main circuit, a resistance in said main circuit between said connections, an adjustable resistance in one of said connections, a resistance across the armature adapted to collect current from different points thereof, and means for taking off current from said last named resistance at a point intermediate the ends thereof.

In testimony whereof I have hereunto signed my name in the presence of two subscribing witnesses.

THOMAS W. VARLEY

Witnesses:
ROBERT W. ASHLEY,
K. G. LE ARD.